C. S. JENSEN.
LIQUID GAGE.
APPLICATION FILED SEPT. 18, 1917.
1,268,356.
Patented June 4, 1918.
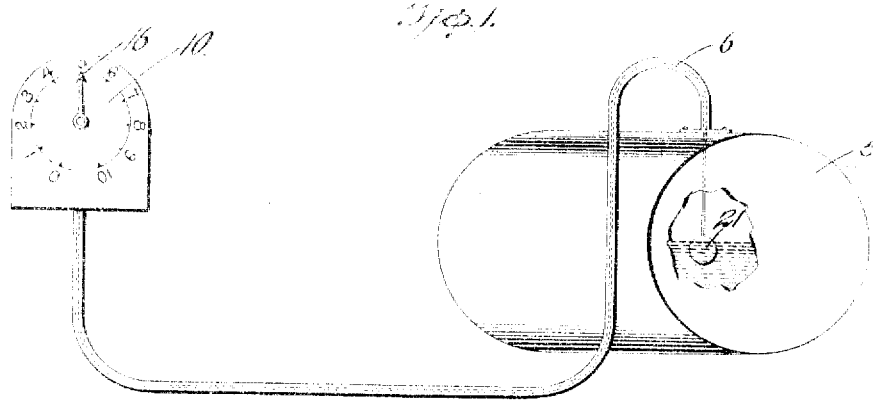
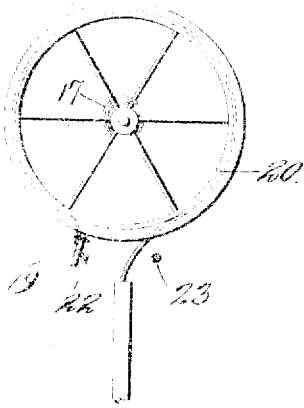
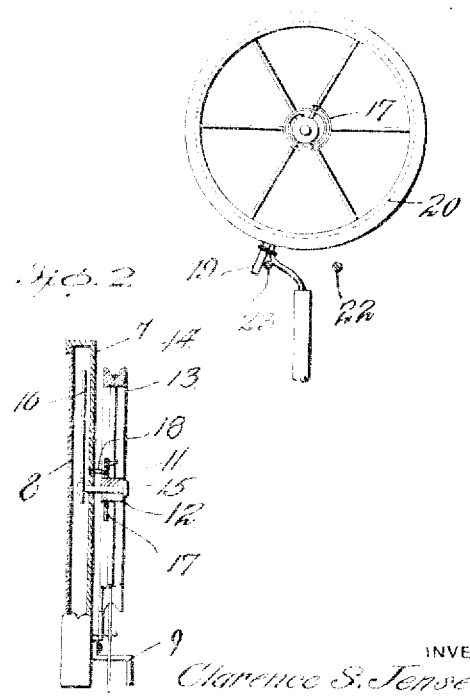
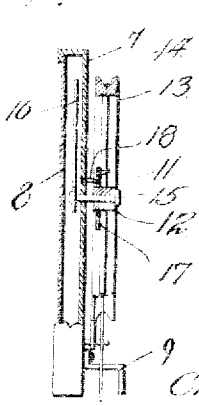
WITNESSES
INVENTOR
Clarence S. Jensen.
BY
ATTORNEY

UNITED STATES PATENT OFFICE.

CLARENCE S. JENSEN, OF VIENNA, SOUTH DAKOTA.

LIQUID-GAGE.

1,268,356.  Specification of Letters Patent.  Patented June 4, 1918.

Application filed September 15, 1917.  Serial No. 191,358.

*To all whom it may concern:*

Be it known that I, CLARENCE S. JENSEN, a citizen of the United States, residing at Vienna, in the county of Clark and State of South Dakota, have invented certain new and useful Improvements in Liquid-Gages, of which the following is a specification.

My present invention relates to liquid gages and more particularly to a gasolene gage for automobiles.

The principal object of the invention resides in the provision of a gage which will accurately indicate the level of the liquid under any condition.

A further object is to provide a gage of this character which may be installed on any automobile without materially changing the parts of the same.

Another important object of this invention is to provide a float controlled gage for indicating the level of the gasolene or other liquids in the reservoir which automatically causes the indicating hand to move to zero position when the tank is emptied.

Still another object resides in the provision of a gage for indicating the amount of liquid fuel contained in the supply tank of the automobile or any other receptacle which is simple in construction, which consists of few parts which may be readily assembled and disassembled, and which may be manufactured and placed on the market at a minimum cost.

The above and other general objects will be fully discussed in the following description, the invention explicitly defined in the appended claims and illustrated in the accompanying drawing.

My invention consists of combinations, arrangements, and details of construction which will be hereinafter specifically referred to and illustrated in the accompanying drawing, in which, Figure 1 is an elevation of my improved gage, the gasolene supply tank being shown in perspective and broken away at one end in order to show the float therein, Fig. 2 is a detail sectional view, of the casing and parts carried thereby, Fig. 3 is an elevation of the actuating wheel detached from the casing and showing the stop pins therefor, and Fig. 4 is a view of the actuating wheel looking from the rear of Fig. 3.

On the drawing wherein like characters of reference designate like parts in all the views the numeral 5 designates a gasolene tank of an automobile which may be mounted in the usual manner, and leading therefrom is a pipe 6 which extends along the floor of the automobile (not shown), in any desirable manner. This pipe is formed of some flexible metal so as to be readily bent to the shape illustrated in Fig. 1.

Adapted to be mounted on the dashboard or any other desirable part of the automobile is a casing 7 which is provided with a glass plate 8. Brackets 9 are mounted on the casing which are adapted to be attached to a support (not shown). A graduated dial 10 is formed on the inner face of the rear wall of the casing 7.

Extending transversely through and revoluble in the rear wall of the casing 7 is a shaft 11. Fixed to rotate with the shaft 11 is a hub 12 of a wheel 13 which wheel is provided with a peripheral groove 14. This hub 12 is retained against shifting in one direction by a head 15 on the shaft 11, and against moving in the opposite direction by the casing 7. An indicating hand 16 is fixed to the inner end of the shaft 11 and is movable over the dial 10.

A coil spring 17 has one end attached to the hub 12, while its opposite end is connected with the casing 7 as at 18. This spring 17 tends to rotate the wheel in a clockwise direction.

A pin 19 is mounted upon the rim of the wheel and has attached thereto a wire or other flexible element 20 which is engaged in the peripheral groove 14 and extends through the tube 6 and into the tank 5. Secured to the extremity of the flexible element 20 that extends within the tank 5 is a float 21. This float 21 is of such weight as to counteract the normal tendency of the spring 17 to rotate the wheel 13. Mounted on the casing 7 adjacent its lower end are stops 22 and 23 which are adapted to be engaged by the pin 19 and thus limit the movement of the wheel 13. The diameter of the wheel 13 is such as to cause a length of the flexible element 20 to wind around the same which is equal to the depth of the tank 5.

From the above disclosure it will be seen that as the fuel in the tank 5 is consumed the float 21 will descend and thus rotate the wheel 13 in a counter-clockwise direction and thereby move the indicator 16 over the dial 10 and toward the zero mark. When the hand 16 will have reached the zero mark the pin 19 will have engaged the stop 23. It will be seen that when the tank 5 is filled, the float 21 will ascend, and owing to the normal tendency of the spring 17, the wheel 13 will be rotated in a clockwise direction. When the fuel in the tank has reached its capacity the hand 16 will have reached the highest mark on the dial 10 and the pin 19 will have contacted with the stop 23.

This disclosure is merely illustrative and it will be understood that the invention is susceptible to various modifications and alterations, and that my limits of modification are only governed by the appended claims.

What is claimed is:

1. An indicator including a casing, a shaft extending transversely through said casing, an indicator mounted on said shaft within said casing, a grooved pulley wheel mounted on said shaft exteriorly of said casing, a plurality of stop pins projecting from said casing, a stop pin carried by said pulley wheel and engageable with said first mentioned stop pins, a cable having one end thereof secured to said pulley wheel, and a float carried by the opposite end of said cable.

2. An indicator including a casing, a shaft extending transversely through said casing, an indicator mounted on said shaft within said casing, a grooved wheel mounted on said shaft exteriorly of said casing, a spring surrounding said shaft and having its opposite ends connecting respectively to said pulley wheel and casing, a stop pin formed on the periphery of said pulley wheel, a plurality of stop pins projecting laterally from the adjacent face of said casing and engageable with said first mentioned stop pin to limit the movement of the pulley wheel in either direction, a hollow pipe connection leading from said casing, a flexible connection movable in said pipe and connected at one end to the grooved portion of said pulley wheel, and a float carried by the opposite end of said flexible connection.

In testimony whereof I affix my signature in presence of two witnesses.

CLARENCE S. JENSEN.

Witnesses:
OTIS SPILDE,
A. M. SOGN.